(12) United States Patent
Shimizu et al.

(10) Patent No.: US 12,087,962 B2
(45) Date of Patent: Sep. 10, 2024

(54) BATTERY PACK AND POWER SUPPLY SYSTEM

(71) Applicant: Panasonic Intellectual Property Management Co., Ltd., Osaka (JP)

(72) Inventors: Keisuke Shimizu, Osaka (JP); Takeshi Nagao, Osaka (JP); Goro Fujita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 590 days.

(21) Appl. No.: 17/296,393

(22) PCT Filed: Nov. 8, 2019

(86) PCT No.: PCT/JP2019/043915
§ 371 (c)(1),
(2) Date: May 24, 2021

(87) PCT Pub. No.: WO2020/116089
PCT Pub. Date: Jun. 11, 2020

(65) Prior Publication Data
US 2022/0021071 A1  Jan. 20, 2022

(30) Foreign Application Priority Data
Dec. 4, 2018 (JP) .................................. 2018-227159

(51) Int. Cl.
| | |
|---|---|
| *H01M 50/342* | (2021.01) |
| *B60L 3/00* | (2019.01) |
| *B60L 58/26* | (2019.01) |
| *B60Q 9/00* | (2006.01) |
| *H01M 10/48* | (2006.01) |
| *H01M 10/613* | (2014.01) |
| *H01M 10/625* | (2014.01) |
| *H01M 10/633* | (2014.01) |

(52) U.S. Cl.
CPC ......... *H01M 50/342* (2021.01); *B60L 3/0046* (2013.01); *B60L 58/26* (2019.02);
(Continued)

(58) Field of Classification Search
CPC ............. H01M 50/342; H01M 10/613; H01M 10/625; H01M 10/633; H01M 2220/20; B60L 58/26; B60L 3/0046; B60Q 9/00
See application file for complete search history.

(56) References Cited

U.S. PATENT DOCUMENTS 8,313,850 B1 * 11/2012 LePort ................... H01M 10/42
429/61
2008/0318121 A1 * 12/2008 Takagi ................. H01M 10/643
429/120
(Continued)

FOREIGN PATENT DOCUMENTS

DE  102013223373 A1 *  5/2015  .......... H01M 10/425
FR  2743452 A1 *  7/1997  .............. H01M 2/34
(Continued)

OTHER PUBLICATIONS

Machine Translation of FR-2743452-A1 (Nov. 27, 2023) (Year: 2023).*
(Continued)

*Primary Examiner* — Matthew J Merkling
(74) *Attorney, Agent, or Firm* — Rimon P.C.

(57) ABSTRACT

Battery pack (10) having a substantially sealed structure includes a plurality of cells (11-16) each having an opened portion provided in order to discharge an internal gas when an internal pressure rises. Non-resettable pressure switch (30, 31) that is connected to controller (50) by a signal line. The pressure switch changes irreversibly from a significant state to a non-significant state when a pressure in battery pack (10) is greater than a predetermined pressure threshold value.

8 Claims, 4 Drawing Sheets

(51) Int. Cl.
  *H01M 10/6552* (2014.01)
  *H01M 10/6563* (2014.01)
  *H01M 10/6568* (2014.01)
  *H01M 10/663* (2014.01)

(52) U.S. Cl.
  CPC .............. *B60Q 9/00* (2013.01); *H01M 10/48* (2013.01); *H01M 10/613* (2015.04); *H01M 10/625* (2015.04); *H01M 10/633* (2015.04); *H01M 10/6552* (2015.04); *H01M 10/6563* (2015.04); *H01M 10/6568* (2015.04); *H01M 10/663* (2015.04); H01M 2220/20 (2013.01)

(56) References Cited

U.S. PATENT DOCUMENTS

| | | | | |
|---|---|---|---|---|
| 2011/0223448 | A1* | 9/2011 | Kim | H01M 50/325 429/53 |
| 2012/0208054 | A1* | 8/2012 | Shirasawa | H01M 50/238 429/90 |
| 2016/0344004 | A1* | 11/2016 | Kepler | H01M 50/317 |
| 2017/0059423 | A1 | 3/2017 | Suzuki | |

FOREIGN PATENT DOCUMENTS

| | | | |
|---|---|---|---|
| JP | 2010-045001 | | 2/2010 |
| JP | 2012-195143 | | 10/2012 |
| JP | 2017-049144 | | 3/2017 |
| JP | 2018-055768 | | 4/2018 |
| JP | 2018-142525 | | 9/2018 |
| WO | 2010/032313 | | 3/2010 |
| WO | WO-2016019924 | A1 * | 2/2016 ................ B25F 5/02 |

OTHER PUBLICATIONS

Machine Translation of DE-102013223373-A1 (Nov. 27, 2023) (Year: 2023).*
International Search Report of PCT application No. PCT/JP2019/043915 dated Jan. 7, 2020.

* cited by examiner

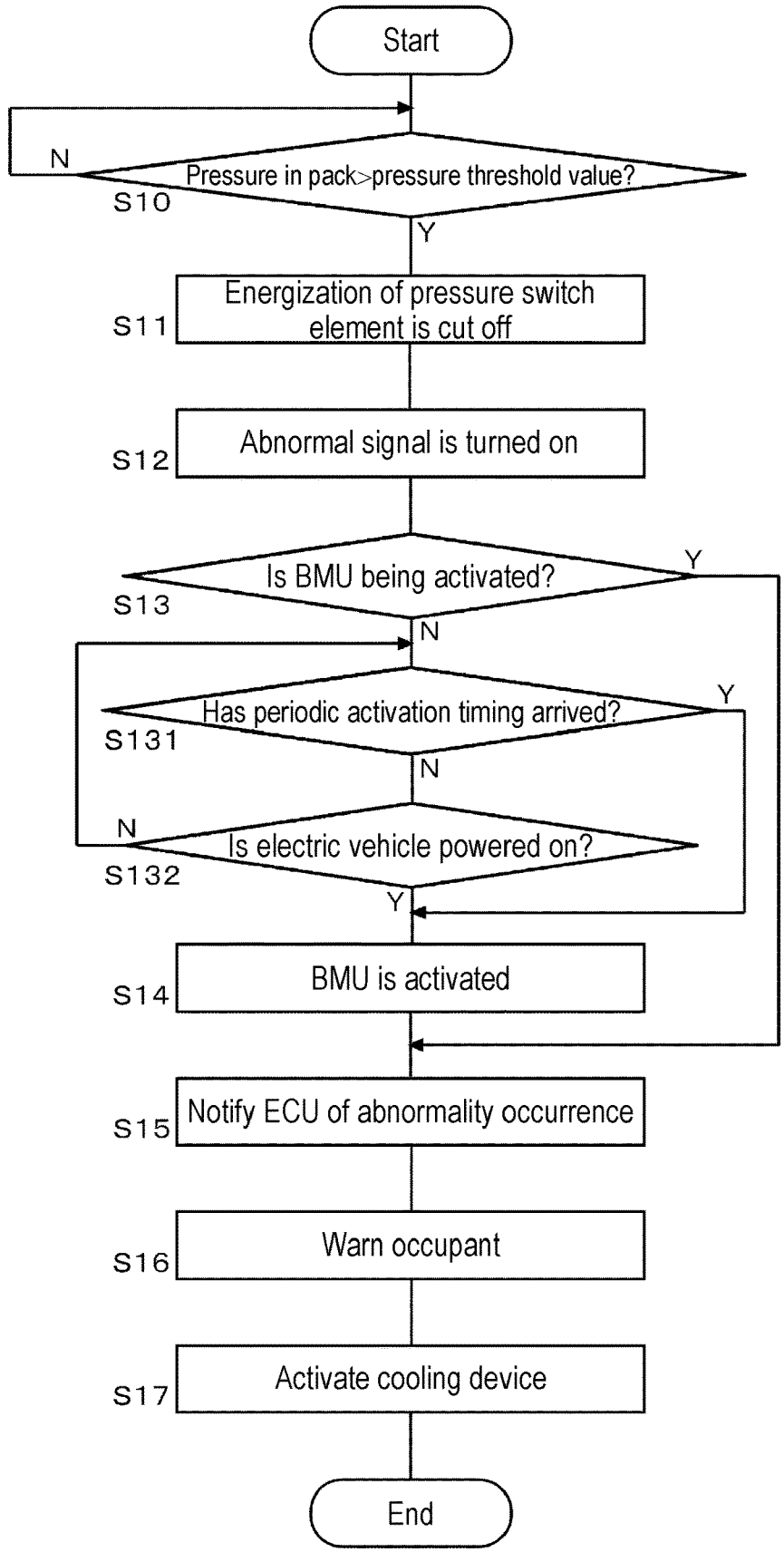

BATTERY PACK AND POWER SUPPLY SYSTEM

CROSS-REFERENCE TO RELATED APPLICATIONS

This application is a U.S. national stage application of the PCT International Application No. PCT/JP2019/043915 filed on Nov. 8, 2019, which claims the benefit of foreign priority of Japanese patent application No. 2018-227159 filed on Dec. 4, 2018, the contents all of which are incorporated herein by reference.

TECHNICAL FIELD

The present invention relates to a battery pack and a power supply system that accommodate a plurality of cells.

BACKGROUND ART

In recent years, hybrid vehicles (HVs), plug-in hybrid vehicles (PHVs), and electric vehicles (EVs) have become widespread. A secondary battery is mounted, as a key device, in these electric vehicles. In an in-vehicle battery pack that is used by electrically connecting dozens to thousands of cells, when an abnormality occurs in the cell in the battery pack, the abnormality is quickly detected, and thus, it is necessary to interrupt the use of the battery pack or to perform predetermined safety processing.

One of methods for detecting the abnormality in the battery, there is a method for measuring a temperature of the battery. In order to detect the abnormality of the battery with high accuracy by measuring the temperature, it is necessary to measure temperatures of all the cells in the battery pack, and thus, the cost and a number of parts increase.

As another method for detecting the abnormality of the battery, there is a method for monitoring a pressure in the battery pack by a pressure sensor (see, for example, PTL 1). In this method, the fact that the pressure in the battery pack rises uniformly due to gas ejected from the cell when the cell is abnormal is used, and the abnormality can be detected with high accuracy by a small number of detection devices.

CITATION LIST

Patent Literature

PTL 1: Unexamined Japanese Patent Publication No. 2010-45001

SUMMARY OF THE INVENTION

However, since the pressure rise in the battery pack when the abnormality occurs in the battery pack is a phenomenon within one to several seconds, it is necessary for a detection system to scan at a shorter cycle than the period in order to detect the abnormality by the pressure sensor, and thus, a load of the detection system increases.

For in-vehicle applications, the detection system is generally shut down or standby while the vehicle is parked. Even though the abnormality occurs in the cell in the battery pack in this state, since the pressure in the battery pack returns to a normal pressure within a few seconds, the abnormality cannot be detected in real time, and the abnormality may also not be detected even when the electric vehicle is activated.

The present invention has been made in view of such a situation, and an object of the present invention is to provide a technique for detecting an abnormality of a cell in a battery pack with high accuracy with a small number of detection devices.

In order to solve the above problems, a battery pack of an aspect of the present invention is a battery pack having a substantially sealed structure. The battery pack includes a plurality of cells each having an opened portion provided in order to discharge an internal gas when an internal pressure rises, and a non-resettable pressure switch that is connected to a controller by a signal line. The pressure switch changes irreversibly from a significant state to a non-significant state when a pressure in the battery pack is greater than a predetermined pressure threshold value.

Any combination of the above components and the conversion of expressions of the present invention between methods, devices, systems, and the like are also effective as aspects of the present invention.

According to the present invention, it is possible to detect the abnormality of the cell in the battery pack with high accuracy with a small number of detection devices.

BRIEF DESCRIPTION OF DRAWINGS

FIG. 4 is a flowchart showing a flow of a second processing example when gas is discharged from the cell in the power supply system according to the exemplary embodiment of the present invention.

DESCRIPTION OF EMBODIMENT

Figure 1:
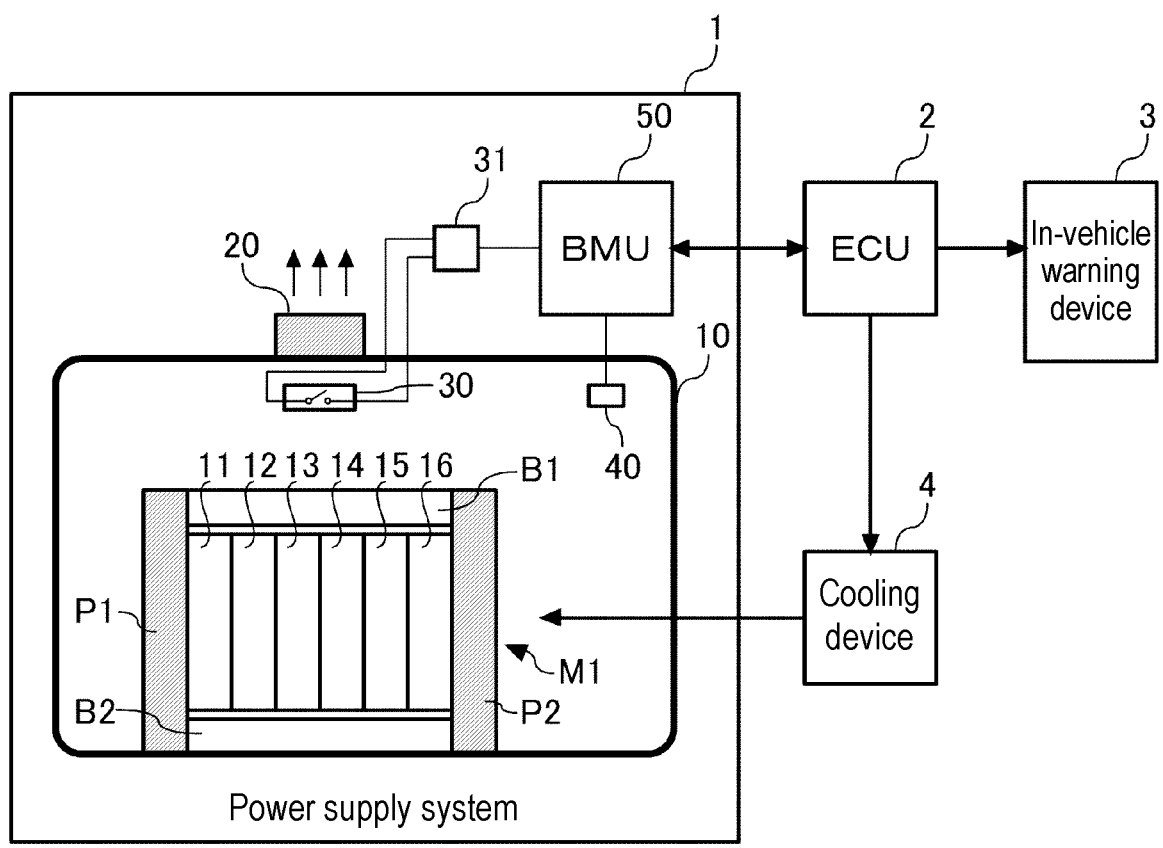
FIG. 1 is a diagram for describing a power supply system according to an exemplary embodiment of the present invention.

FIG. 1 is a diagram for describing power supply system 1 according to an exemplary embodiment of the present invention. In the present exemplary embodiment, an example in which power supply system 1 is a drive battery mounted on an electric vehicle will be described. Power supply system 1 includes battery pack 10 having a substantially sealed structure in which battery module M1 is housed. Although only one battery module M1 is depicted in FIG. 1 in order to simplify the drawing, a plurality of battery modules is actually housed in many cases. The plurality of battery modules is connected in series, in parallel, or in series and parallel.

Battery module M1 contains a plurality of cells 11-16. Although FIG. 1 depicts an example in which battery module M1 accommodates six cells, a number of cells accommodated may be more than six or may be less than six. The plurality of cells 11-16 may be electrically connected in series, in parallel, or in series and parallel. In the following description, the series connection is assumed.

The cell is a secondary battery such as a square type, a cylindrical type, or a laminated type, and a lithium-ion battery, a nickel-hydrogen battery, a lead battery, or the like can be used. Hereinafter, an example in which a square lithium-ion battery is used is assumed in the present specification. The plurality of cells 11-16 is stacked in a row with a surface having the largest area as a stacked surface. Two end plates P1, P2 are provided on both end faces of the plurality of cells 11-16 in a stacking direction so as to sandwich the plurality of cells 11-16. End plates P1, P2 at both ends are connected by a plurality of side bind bars. Specifically, at least one side bind bars B1, B2 is provided on each of both sides of the plurality of stacked cells 11-16.

When an abnormality such as an internal short circuit or overcharging occurs in the cell, an internal pressure rises to generate a high-temperature gas. In the square or cylindrical cell, a safety valve (not shown) is generally provided on a top surface of an outer case in order to discharge an internal gas when the internal pressure rises. The laminated cell is designed to discharge the internal gas by tearing a sealing portion of a laminate material when the internal pressure rises. In either case, an opened portion for discharging the internal gas is provided. Hereinafter, in the present exemplary embodiment, it is assumed that the square cell having the safety valve on the top surface of the outer case is used for each of the plurality of cells 11-16.

Battery pack 10 includes pressure release mechanism 20. Pressure release mechanism 20 is activated when an internal pressure value in battery pack 10 is higher than a predetermined value (activating pressure value), and discharges the gas in battery pack 10 to the outside. Pressure release mechanism 20 has, for example, a discharge valve opened when the internal pressure value is higher than an activating pressure value. When the safety valve of any of the plurality of cells 11-16 is opened and the gas is discharged from the inside of the cell, the internal pressure in battery pack 10 also rises, and when the internal pressure exceeds the activating pressure value of pressure release mechanism 20, pressure release mechanism 20 is activated. For example, the activating pressure value of pressure release mechanism 20 is set to 10 to 50 kPa (gauge pressure).

Pressure switch element 30 is provided near pressure release mechanism 20 at a position through which the gas discharged from the plurality of cells 11-16 passes. Pressure switch element 30 is desirably attached to a position at which the influence of heat is small. Each of the safety valves of the plurality of cells 11-16 and pressure release mechanism 20 may be connected by a sealed discharge passage. In this case, pressure switch element 30 is installed inside the discharge passage.

Both ends of pressure switch element 30 are connected to detection circuit 31. Pressure switch element 30 and detection circuit 31 form a pressure switch. When the internal pressure value in battery pack 10 is greater than a predetermined pressure threshold value, the pressure switch is a non-resettable switch that irreversibly changes from a significant state to a non-significant state. The pressure threshold value is set to a value smaller than the activating pressure value of pressure release mechanism 20.

For example, a mechanical non-resettable switch of which a switching state is switched by displacing a mechanical movable contact piece can be used as pressure switch element 30. Specifically, pressure switch element 30 is installed in a location at which a differential pressure inside and outside battery pack 10 can be detected so as to close an opening provided so as to be able to be ventilated on a wall surface of battery pack 10, and the movable contact piece is displaced by a pressure change inside battery pack 10. Detection circuit 31 detects the displacement of the movable contact piece and detects the switching of pressure switch element 30.

A pressure-sensitive sensor that utilizes a piezoresistive effect can be used as pressure switch element 30. A resistance value of the pressure-sensitive sensor changes according to a pressure on a sensitive portion. Specifically, as the pressure rises, the resistance value decreases. Detection circuit 31 applies a predetermined constant voltage to both ends of pressure switch element 30. When current exceeding a current threshold value corresponding to the pressure threshold value flows, a switch that irreversibly turns off is inserted into a closed loop of detection circuit 31 and pressure switch element 30. When the pressure on the sensitive portion exceeds the pressure threshold value, the current exceeding the current threshold value flows and the switch is turned off. Instead of the switch, a fuse that melts when the current exceeding the current threshold value flows may be used.

Detection circuit 31 transmits an abnormal signal to battery management unit (BMU) 50 when the switch is turned off. For example, detection circuit 31 and BMU 50 are connected by a signal line, and detection circuit 31 continues to output a low level as a normal signal in a state in which the switch is turned on. Detection circuit 31 continues to output a high level as an abnormal signal in a state in which the switch is turned off. On the contrary, detection circuit 31 may continue to output the high level as the normal signal in a state in which the switch is turned on, and may continue to output the low level as the abnormal signal in a state in which the switch is turned off.

A configuration of the pressure switch is an example. A switch which applies a bias voltage to both ends of pressure switch element 30 and has both ends to which another voltage is applied from detection circuit 31 is provided, and the switch may be configured to irreversibly turned on by electromagnetic induction when the current flowing through pressure switch element 30 exceeds the current threshold value corresponding to the pressure threshold value. Detection circuit 31 transmits the abnormal signal to BMU 50 when the switch is turned on.

Pressure switch element 30 may be four piezoresistive elements forming a general Wheatstone bridge circuit. In this case, once an output voltage of the Wheatstone bridge circuit exceeds a voltage threshold value corresponding to the pressure threshold value, detection circuit 31 continues to transmit the abnormal signal to BMU 50. Detection circuit 31 continues to transmit the abnormal signal to BMU 50 even though the output voltage of the Wheatstone bridge circuit drops.

BMU 50 is a controller that manages power supply system 1. A voltage value, a current value, and a temperature value of the plurality of cells 11-16 are input to BMU 50. For example, the voltage value is measured by a voltage sensor including an application-specific integrated circuit (ASIC) or an analog front end (not shown), the current value is measured by a current sensor using a shunt resistor or a Hall element (not shown), and the temperature value is measured by a temperature sensor using a thermistor (not shown). BMU 50 monitors whether or not an overvoltage, an undervoltage, an overcurrent, or a temperature abnormality has occurred in the plurality of cells 11-16 based on the voltage value, the current value, and the temperature value of the plurality of cells 11-16.

In the present exemplary embodiment, the signal line from detection circuit 31 is connected to a port that receives an activation signal of BMU 50. In a shutdown state or standby state, BMU 50 is activated when the abnormal signal is received from detection circuit 31, and determines that the abnormality has occurred in cells 11-16 in battery pack 10.

When it is determined that the abnormality has occurred in cell 11-16 in battery pack 10, BMU 50 notifies electronic control unit (ECU) 2 of an abnormality occurrence signal of the cell via an in-vehicle network such as a controller area network (CAN).

When it is determined that the abnormality has occurred in cell 11-16 in battery pack 10, BMU 50 turns on sensor 40. For example, sensor 40 may be a pressure sensor having a higher performance than the pressure switch. For example, the sensor may be a pressure sensor constituted by a Wheatstone bridge circuit including four piezoresistive elements. When it is determined that the abnormality has occurred in cells 11-16 in battery pack 10, BMU 50 causes a predetermined constant current to flow to the input terminal of the Wheatstone bridge circuit. When the current is supplied to the input terminal, a voltage corresponding to a detected pressure is generated at an output terminal of the Wheatstone bridge circuit and is supplied to BMU 50. BMU 50 estimates a pressure value in battery pack 10 based on the voltage value input from sensor 40.

ECU 2 is a controller that controls the entire electric vehicle, and may be, for example, an integrated vehicle control module (VCM). When the abnormality occurrence signal of the cell is received from BMU 50, ECU 2 notifies in-vehicle warning device 3 in the electric vehicle of the abnormality of battery pack 10. In-vehicle warning device 3 is a user interface for warning an occupant of the abnormality in battery pack 10. For example, ECU 2 turns on an abnormal lamp of battery pack 10 provided on an instrument panel. The in-vehicle warning device may notify the occupant of the abnormality of battery pack 10 by a voice message.

In a case where power supply system 1 is a drive battery mounted on a hybrid car, when the abnormality occurrence signal of the cell is received from BMU 50 during motor traveling, ECU 2 stops the motor traveling and switches to engine traveling.

When power supply system 1 is a drive battery mounted on a pure electric vehicle, both safety and convenience are achieved by allowing self-driving to a car dealer or a repair shop while ensuring safety. As a method of ensuring safety, it is conceivable to cool power supply system 1.

When the abnormality occurrence signal of the cell is received from BMU 50, ECU 2 activates cooling device 4 to cool cells 11-16 in battery pack 10. In the case of a water cooling method, cooling device 4 has a radiator such as heat radiation fins and an electric fan for cooling a cooling liquid (hereinafter, referred to as coolant liquid). Instead of the electric fan, the cooling device may be configured to cool the coolant liquid by a cooling air of an air conditioner system in conjunction with the air conditioner system in the vehicle.

Cooling device 4 and power supply system 1 are connected by a coolant pipe (not shown). A cooling plate (not shown) is attached to battery module M1 of power supply system 1. The cooling plate is attached to battery module M1 via an insulating heat conductive sheet (not shown). When the outer case of the cell is made of an insulating material, the cooling plate may be directly attached to battery module M1. In the case of an air cooling method, the cooling air generated by the electric fan or the air conditioner system is directly supplied to cells 11-16 in battery pack 10.

In a case where cooling device 4 is working, when the abnormality occurrence signal of the cell is received from BMU 50, ECU 2 may instruct cooling device 4 to increase a cooling capacity. For example, when the electric fan is used, the ECU may instruct the cooling device to increase a rotation speed of the electric fan in order to lower a temperature of the coolant liquid. For example, the ECU may instruct the cooling device to rotate the electric fan at a maximum rotation speed. When the coolant liquid is cooled by the air conditioner, the ECU may instruct the cooling device to lower a temperature of the cooling air or increase an air volume of the cooling air.

Figure 2:
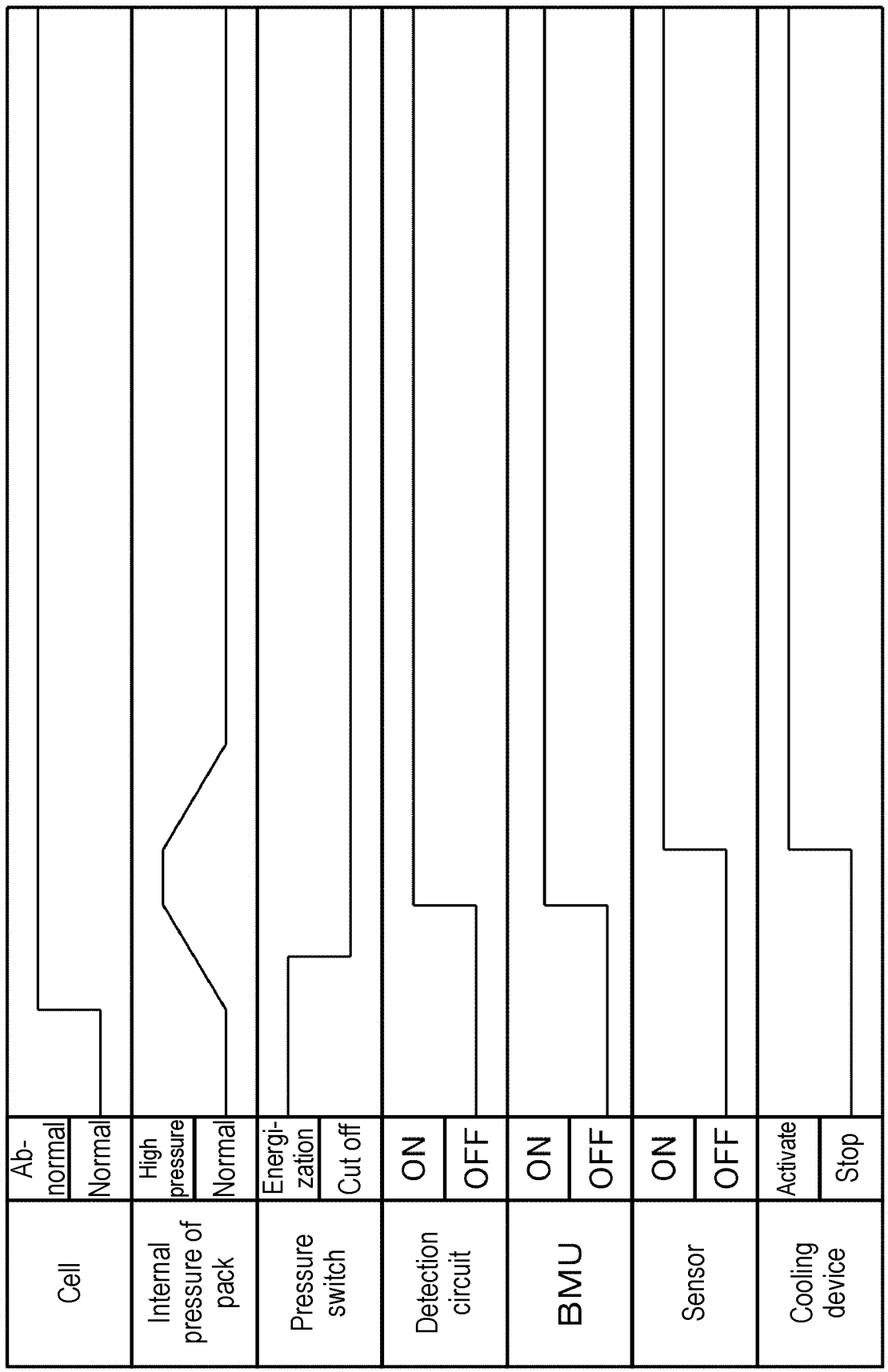
FIG. 2 is a diagram showing a sequence during gas discharge from a cell in the power supply system according to the exemplary embodiment of the present invention.

FIG. 2 is a diagram showing a sequence during the gas discharge from the cell in power supply system 1 according to the exemplary embodiment of the present invention. When the abnormality has occurred in the internal pressure of the cell, the safety valve is opened and the gas is discharged into battery pack 10. When the pressure of battery pack 10 exceeds the pressure threshold value of the pressure switch, the energization of pressure switch element 30 is cut off. Accordingly, an output signal of detection circuit 31 indicating the abnormality occurrence of the cell is turned on, BMU 50 is activated, and BMU 50 is turned on. BMU 50 turns on sensor 40 to acquire more detailed pressure data. BMU 50 notifies ECU 2 of the abnormality occurrence of the cell, and ECU 2 activates cooling device 4.

Figure 3:
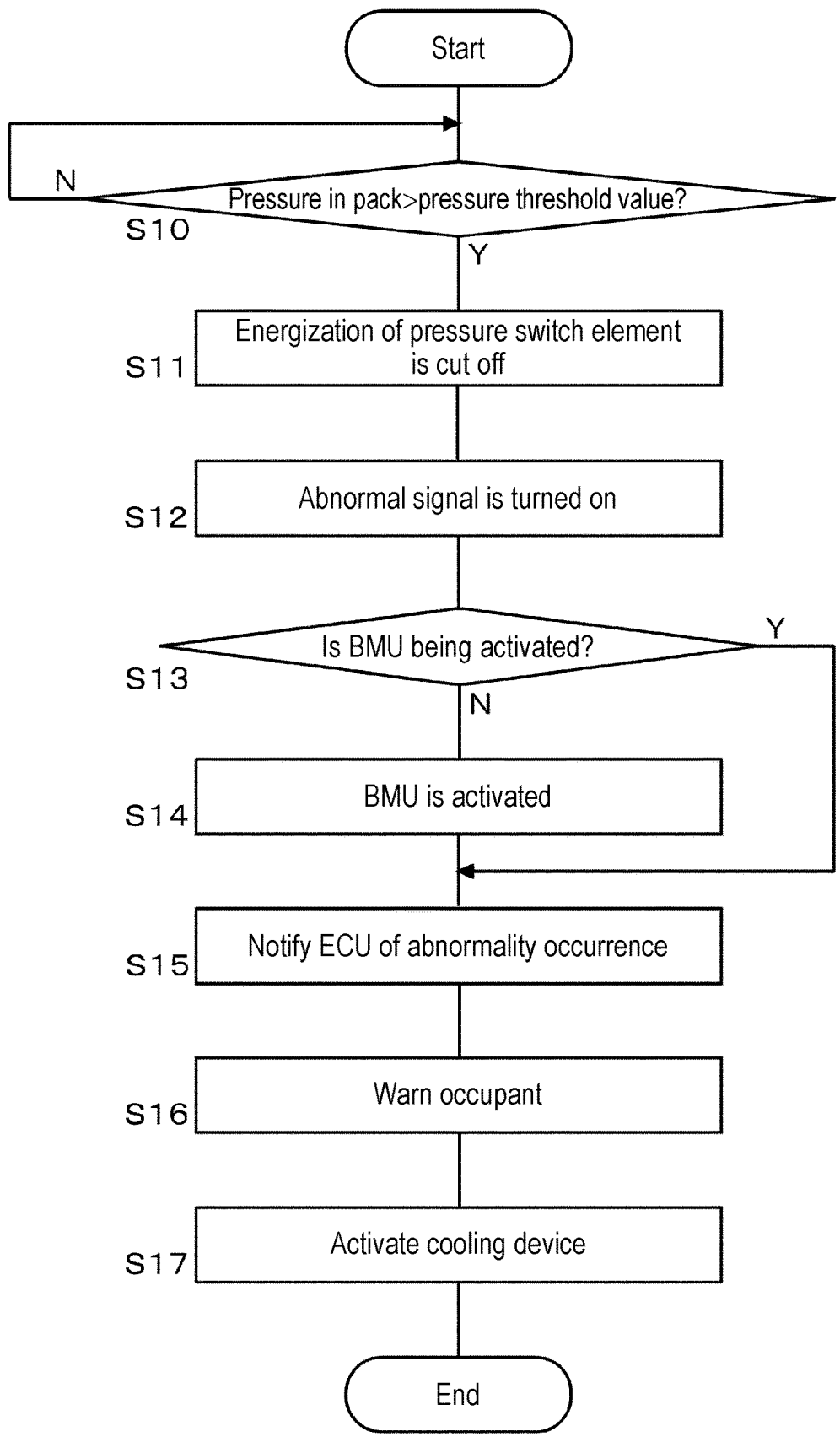
FIG. 3 is a flowchart showing a flow of a first processing example when gas is discharged from the cell in the power supply system according to the exemplary embodiment of the present invention.

FIG. 3 is a flowchart showing a flow of a first processing example when the gas is discharged from the cells in power supply system 1 according to the exemplary embodiment of the present invention. When the pressure in battery pack 10 exceeds the pressure threshold value of the pressure switch (Y in S10), the energization of pressure switch element 30 is cut off (S11), and the abnormal signal supplied from detection circuit 31 to BMU 50 is turned on (S12). When BMU 50 is in the shutdown state or standby state (N in S13), BMU 50 is activated when the abnormal signal is turned on (S14). When BMU 50 is being activated (Y in S13), processing in step S14 is skipped.

BMU 50 notifies ECU 2 of the abnormality occurrence signal of the cell (S15). ECU 2 causes in-vehicle warning device 3 to notify the occupant of the abnormality of battery pack 10 (S16). ECU 2 activates cooling device 4 to cool the cells in battery pack 10 (S17).

FIG. 4 is a flowchart showing a flow of a second processing example when the gas is discharged from the cells in power supply system 1 according to the exemplary embodiment of the present invention. In the above description, it is assumed that the signal line from detection circuit 31 is connected to the port that receives the activation signal of BMU 50. In the second processing example, it is assumed that the signal line from detection circuit 31 is connected to a port that receives a sensor input instead of the port that receives the activation signal of BMU 50. That is, when BMU 50 is in the shutdown state or standby state, it is assumed that BMU 50 does not activate immediately even though detection circuit 31 outputs the abnormal signal.

When the pressure in battery pack 10 exceeds the pressure threshold value of the pressure switch (Y in S10), the energization of pressure switch element 30 is cut off (S11), and the abnormal signal supplied from detection circuit 31 to BMU 50 is turned on (S12). When BMU 50 is in the shutdown state or standby state (N in S13) and a periodic activation timing of BMU 50 has arrived (Y in S131), BMU 50 is activated (S14).

When the electric vehicle is parked and the battery module is not externally charged, BMU 50 is in the shutdown state or standby state in order to reduce power consumption of BMU 50. Even though BMU 50 is in the shutdown state or standby state, BMU 50 is activated periodically in order to monitor the presence or absence of the abnormality in the plurality of cells 11-16 in battery pack 10. BMU 50 is activated periodically to acquire the voltage value, the current value, and the temperature value of the plurality of cells 11-16 and to determine the presence or absence of the abnormality. In the present exemplary embodiment, the BMU also determines the presence or absence of the abnormal signal from detection circuit 31. For example, BMU 50 is activated every 5 to 60 minutes to determine the presence or absence of the abnormality.

In a period in which the periodic activation timing of BMU 50 has not arrived (N in S131), when the electric vehicle is powered on (corresponding to ignition-on of an engine vehicle) by a driver (Y in S132), BMU 50 is activated (S14). When BMU 50 is being activated (Y in S13), pieces of processing in steps S131, S132, and S14 are skipped.

BMU 50 notifies ECU 2 of the abnormality occurrence signal of the cell (S15). ECU 2 causes in-vehicle warning device 3 to notify the occupant of the abnormality of battery pack 10 (S16). ECU 2 activates cooling device 4 to cool the cells in battery pack 10 (S17).

As described above, according to the present exemplary embodiment, the pressure in battery pack 10 that changes uniformly due to the gas discharge from the safety valve of the cell is used as a detection target, and thus, the abnormality of the cell can be detected with high accuracy by a small number of detection devices. For example, when the discharge of the high-temperature gas from the safety valve of the cell is detected by the temperature by using the thermistor, it is necessary to install many thermistors, and thus, the cost and the number of parts increase.

The non-resettable pressure switch is used as the detection device, and thus, it is possible to detect a change in the pressure in battery pack 10 having a short change time with high accuracy. The pressure rise inside the battery pack due to the gas discharge from the safety valve of the cell returns to a normal pressure within few seconds. For example, when BMU 50 scans the value of the pressure sensor at intervals of 5 seconds or more in order to reduce a load, the pressure rise may not be detected by merely monitoring a pressure value using a general pressure sensor.

For example, when the value of the pressure sensor is scanned at intervals of 1 second, the pressure rise can be detected, but the load of BMU 50 increases. When BMU 50 is in the shutdown state or standby state, it is almost impossible to detect the pressure rise when the BMU is periodically activated. On the other hand, according to the present exemplary embodiment, since the non-resettable pressure switch is used, when BMU 50 is not activated at the next scanning timing after the pressure rise during the activation of BMU 50, the BMU can detect the pressure rise at the time of next activation.

An electric switch is used as the detection device, and thus, the detection device itself can be used as an activation switch of BMU 50, and BMU 50 can be activated when the pressure rises. Even though the detection device is not used as the activation switch of BMU 50, the pressure rise can be detected at least at a point in time when the driver turns on the electric vehicle. On the other hand, in the configuration using the general pressure sensor, since a history of the pressure rise does not remain, the pressure rise cannot be detected afterward.

Although it is also conceivable to detect the cell with the opened safety valve from the cell voltage, when the cell with the opened safety valve is connected in parallel with another cell, it is difficult to detect the abnormality of the cell from the voltage. As described above, according to the present exemplary embodiment, it is possible to detect the abnormality of the cell with high accuracy at low cost and low load.

The present invention has been described above based on the exemplary embodiment. The exemplary embodiment is an example, and it is understood by those skilled in the art that various modification examples can be made for combinations of the components and processing processes and that such modification examples are also within the scope of the present invention.

In the above-described exemplary embodiment, the example in which the non-resettable pressure switch is used has been described. In this regard, in the configuration in which the signal line from detection circuit 31 is connected to the port that receives the activation signal of BMU 50 as in the first processing example, it is also possible to use a resettable pressure switch. Since BMU 50 can grasp the pressure rise at a point in time when the pressure switch changes from the significant state to the non-significant state, even though the pressure switch returns to the original state, a situation in which the pressure rise cannot be detected is avoided. In this case, the general pressure sensor can be used, and the pressure switch can be reused.

Although detection circuit 31 and BMU 50 are depicted outside battery pack 10 in FIG. 1, detection circuit 31 and BMU 50 may also be accommodated in battery pack 10. Although the example in which cooling device 4 is controlled by ECU 2 is depicted in FIG. 1, cooling device 4 may be directly controlled by BMU 50.

Although sensor 40 is depicted in FIG. 1, sensor 40 is not essential and can be omitted. Although the example in which sensor 40 is the pressure sensor has been described, sensor 40 may be a temperature sensor or a voltage sensor. In either case, any detection device that can detect the state of the cell in more detail may be used.

Although the example in which power supply system 1 is used for in-vehicle applications has been described in the above-described exemplary embodiment, the power supply system can also be used for stationary power storage applications and electronic devices such as notebook personal computers (PCs) and smartphones.

The exemplary embodiment may be specified by the following items.

[Item 1]

There is provided battery pack (10) having a substantially sealed structure. Battery pack (10) includes a plurality of cells (11-16) each having an opened portion provided in order to discharge an internal gas when an internal pressure rises and non-resettable pressure switch (30, 31) that is connected to controller (50) by a signal line. Pressure switch (30, 31) changes irreversibly from a significant state to a non-significant state when a pressure in battery pack (10) is greater than a predetermined pressure threshold value.

Accordingly, it is possible to detect the gas discharge from cells (11-16) with high accuracy by one pressure switch (30, 31) without raising a load of controller (50).

[Item 2]

In battery pack (10) according to the item 1, battery pack further includes pressure release mechanism (20) that is operated when the pressure in battery pack (10) exceeds a predetermined pressure. A pressure threshold value at which a state of pressure switch (30, 31) changes is set to a value lower than an operating pressure of pressure release mechanism (20).

Accordingly, it is possible to change the state of pressure switch (30, 31) before pressure release mechanism (20) is released.

[Item 3]

Power supply system (1) includes battery pack (10) according to the item 1 or 2, and controller (50) that is connected to pressure switch (30, 31) by the signal line.

Accordingly, it is possible to construct power supply system (1) capable of basically detecting the gas discharge from cells (11-16) with high accuracy by one pressure switch (30, 31) without raising the load of controller (50).

[Item 4]

In power supply system (1), controller (50) is activated when pressure switch (30, 31) changes from a significant state to a non-significant state. Accordingly, it is possible to detect the gas discharge from cells (11-16) in real time even though controller (50) in the shutdown state or standby state.

[Item 5]

In power supply system (1) according to the item 3 or 4, controller (50) acquires an output value of another sensor (40) in battery pack (10) when it is detected that pressure switch (30, 31) changes from the significant state to the non-significant state.

Accordingly, controller (50) can grasp a more detailed situation in battery pack (10).

[Item 6]

In power supply system (1) according to any one of the items 3 to 5, power supply system (1) is mounted on an electric vehicle, controller (50) transmits an abnormal occurrence signal to controller (2) on a vehicle side when it is determined that battery pack (10) is abnormal based on a state of pressure switch (30, 31), and controller (2) on the vehicle side notifies user interface (3) in the electric vehicle of an abnormality of battery pack (10) when the abnormality occurrence signal is received.

Accordingly, the occupant can recognize the abnormality of battery pack (10).

[Item 7]

In power supply system (1) according to any one of the items 3 to 6, controller (50) operates cooling device (4) for cooling battery pack (10) when it is determined that battery pack (10) is abnormal based on a state of pressure switch (30, 31).

Accordingly, it is possible to suppress the spread of the abnormality of the cell of battery pack (10) to another cell.

[Item 8]

There is provided battery pack (10) having a substantially sealed structure, and battery pack (10) includes plurality of cells (11-16) each having an opened portion provided in order to discharge an internal gas when an internal pressure rises, and pressure switch (30, 31) that is connected to controller (50) by a signal line. Pressure switch (30, 31) changes from a significant state to a non-significant state and notifies controller (50) of the change of the state via the signal line when a pressure in battery pack (10) is greater than a predetermined pressure threshold value.

Accordingly, it is possible to basically detect the gas discharge from cells (11-16) with high accuracy in real time by one pressure switch (30, 31) without raising the load of controller (50).

REFERENCE MARKS IN THE DRAWINGS

1: power supply system
10: battery pack
20: pressure release mechanism
30: pressure switch element
31: detection circuit
40: sensor
50: BMU
M1: battery module
11-16: cell
B1,B2: bind bar
P1,P2: end plate
2: ECU
3: in-vehicle warning device
4: cooling device

The invention claimed is:

1. A power supply system comprising:
a battery pack having a substantially sealed structure, the battery pack comprising:
a battery module containing a plurality of battery cells each of the plurality of battery cells having a safety valve which opens in order to discharge an internal gas when an internal pressure rises; and
a pressure switch that is non-resettable and connected to a controller by a signal line, the pressure switch disposed within the battery pack and outside of the battery module; and
a pressure release mechanism to discharge gas from the battery pack, the pressure release mechanism disposed outside the battery pack and outside of the battery module,
wherein the pressure switch changes irreversibly from a normal state to a fault state after any of the safety valves opens and a pressure in the battery pack is greater than a predetermined pressure threshold value.

2. The power supply system according to claim 1, wherein the pressure release mechanism is activated when the pressure in the battery pack exceeds a predetermined pressure, wherein the predetermined pressure threshold value at which the state of the pressure switch changes is set to a value lower than an activating pressure of the pressure release mechanism.

3. The power supply system of claim 1, further comprising:
a controller that is connected to the pressure switch by the signal line.

4. The power supply system according to claim 3, wherein the controller is activated when the pressure switch changes from the normal state to the fault state.

5. The power supply system according to claim 3, wherein the controller acquires an output value of another sensor in the battery pack when it is detected that the pressure switch changes from the normal state to the fault state.

6. The power supply system according to claim 3, wherein
the power supply system is mounted on an electric vehicle,
the controller transmits an abnormal occurrence signal to a controller on a vehicle when the controller determines that the battery pack is abnormal based on a state of the pressure switch, and
the controller on the vehicle notifies a user interface in the electric vehicle of an abnormality of the battery pack when the abnormal occurrence signal is received.

7. The power supply system according to claim 3, wherein the controller activates a cooling device for cooling the battery pack when the controller determines that the battery pack is abnormal based on the state of the pressure switch.

8. A power supply system comprising:
a battery pack having a substantially sealed structure, the battery pack comprising:
a plurality of battery cells each having a safety valve which opens in order to discharge an internal gas when an internal pressure rises; and
a pressure switch that is connected to a controller by a signal line, wherein the pressure switch changes from a normal state to a fault state and notifies the controller of the change via the signal line when a pressure in the battery pack is greater than a predetermined pressure threshold value, the pressure switch disposed within the battery pack; and
a pressure release mechanism to discharge gas from the battery pack, the pressure release mechanism is disposed outside the battery pack.

* * * * *